April 28, 1959      H. SIXSMITH      2,884,282

BEARINGS FOR ROTATING SHAFTS WHICH ARE LUBRICATED BY GAS

Filed March 13, 1956      6 Sheets-Sheet 2

INVENTOR:
HERBERT SIXSMITH
By:
Stevens, Davis, Miller & Mosher
Attorneys

April 28, 1959   H. SIXSMITH   2,884,282
BEARINGS FOR ROTATING SHAFTS WHICH ARE LUBRICATED BY GAS
Filed March 13, 1956   6 Sheets-Sheet 4

INVENTOR:
HERBERT SIXSMITH

April 28, 1959     H. SIXSMITH     2,884,282
BEARINGS FOR ROTATING SHAFTS WHICH ARE LUBRICATED BY GAS

INVENTOR:
HERBERT SIXSMITH

April 28, 1959     H. SIXSMITH     2,884,282
BEARINGS FOR ROTATING SHAFTS WHICH ARE LUBRICATED BY GAS
Filed March 13, 1956     6 Sheets-Sheet 6

INVENTOR:
HERBERT SIXSMITH

Attorneys

United States Patent Office 2,884,282
Patented Apr. 28, 1959

2,884,282

BEARINGS FOR ROTATING SHAFTS WHICH ARE LUBRICATED BY GAS

Herbert Sixsmith, Reading, England, assignor to National Research Development Corporation, London, England, a corporation of Great Britain Application March 13, 1956, Serial No. 571,202

Claims priority, application Great Britain March 16, 1955

8 Claims. (Cl. 308—9)

This invention relates to bearings for rotating shafts where gas under pressure is introduced between the relatively rotating parts in place of conventional lubricants.

According to the invention there is provided a gas-lubricated bearing comprising a shaft surrounded by a sleeve with means for introducing gas under pressure into a clearance space between the shaft and the sleeve, means for varying the rate of flow of the said gas in the clearance space under control of oscillations of the shaft means for deriving a varying gas pressure from the said varying flow, means for adjusting the phase of such varying pressure and means for applying the said varying pressure after phase adjustment to the surface of the shaft in opposition to the said oscillations.

According to the invention there is further provided a bearing comprising a shaft surrounded by a sleeve having an inner surface spaced from the shaft to form a clearance space surrounding the shaft, at least one passage communication with the clearance space for the introduction into the clearance space of gas under pressure, a plurality of openings in the sleeve (which may perform the functions of some at least of the said passage or passages) communicating with the clearance space at locations spaced apart around the shaft, means for producing a flow of the said gas between each of the openings and the clearance space adjacent to that opening arranged so that the rate of flow is varied by reason of, and is related in phase to any oscillations of the shaft referred to as diameter of the sleeve passing through such opening, pneumatic phase shifting means associated with each of the said openings arranged to derive from such variations of gas flow a correspondingly varying gas pressure in the said opening, the phase of which is such that the resulting force acting on the surface of shaft opposite the said opening has a vector component the maxima of which coincide with velocity maxima of oscillation of the shaft referred to the said diameter and the sign of which vector component is such as to oppose the said oscillation.

The invention will be more readily understood from the following detailed description and the accompanying drawings in which.

The simplest type of bearing for a rotating shaft consists of an uninterrupted cylinder of slightly larger diameter than the shaft, the interspace being filled with a continuous film of lubricant.

Figure 1:
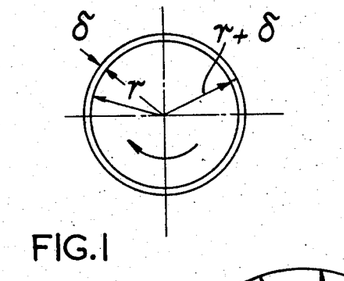
Figs. 1, 2 and 3 are diagrammatic representations of bearings of conventional type.

When the bearing carries no load the shaft rotates concentrically within the sleeve, the film of lubricant being carried round with an average velocity of half that of the shaft. Fig. 1 shows a shaft of radius $r$ rotating in a sleeve of radius $r+\delta$ the interspace $\delta$ being filled with lubricant. If a load F is applied to the shaft (Fig. 2) it will shift to an eccentric position O′ in the sleeve, the direction of the displacement OO′ being at right angles to the direction of the applied load F.

Figure 2:
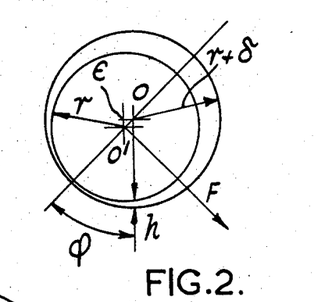

The theory of lubrication shows that for an infinitely long bearing the relationship between the load and the displacement is as shown in Fig. 2, the shaft axis O′ being displaced from the bearing axis O along a line O—O′ at right angles to the line of action of the load F.

Figure 3:
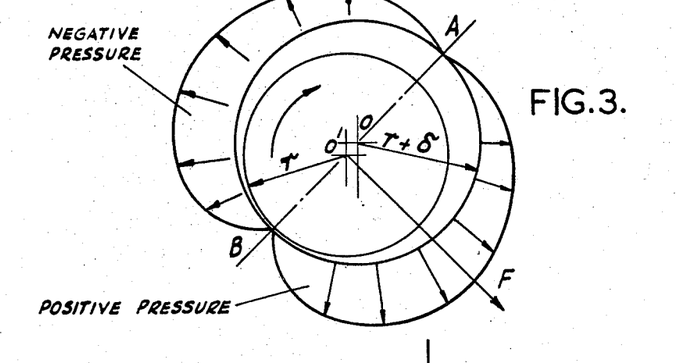

The pressure distribution round the bearing when the displacement O—O′ is equal to half the radial clearance has the form shown in Fig. 3. The pressure distribution is symmetrical about a diameter AB which is perpendicular to the applied load. This form of pressure distribution is due to the fact that the lubricant from A to B in a clockwise direction is being pulled round by the shaft into a converging film, thus producing pressures above the average. The converse holds from B to A clockwise, the pressures on this side of AB being symmetrically equal but of opposite sign.

Suppose now that a radial constraint is applied to the shaft so that the eccentricity OO′ is held constant and that the load F is removed. The lubricant is now being carried round at point A at a rate higher than that prevailing at B owing to the larger clearance at A. The difference between these two rates causes the centre of the shaft O′ to rotate about the centre of the sleeve O with an angular velocity which can be shown to be half the angular velocity of spin of the shaft. This rotation of the centre O′ of the shaft, about the centre O of the bearing sleeve is hereinafter referred to as "whirl."

Under these conditions centrifugal force will tend to oppose the radial restraint with a force proportional to the mass of the shaft, the eccentricity (O—O′) and the square of the velocity of whirl. In the absence of radial constraint the shaft will spiral outwards until it makes contact with sleeve. In the case of an air lubricated bearing such contact results in mutual abrasion of the shaft and sleeve and must not be allowed to occur.

Figure 4:
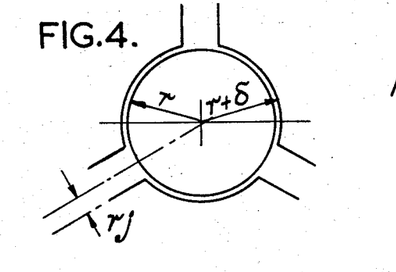
Fig. 4 is a diagrammatic representation of a known type of gas-lubricated bearing.

In air lubricated bearings as hitherto known the shaft is supported by compressed air entering through a number of jets as shown in Fig. 4, a minimum of three jets being usually necessary. The flow of air is determined mainly by the circumference of the jet and the minimum cross sectional area of the escape path via the bearing clearance.

Figure 5:
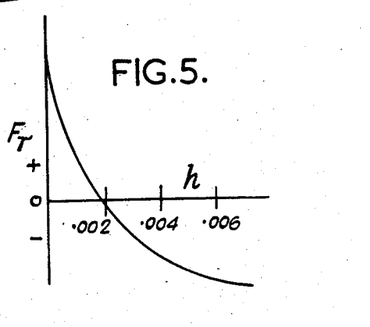
Fig. 5 is a graph relating to the operation of the bearing shown in Fig. 4.

Each jet supports the shaft with a force which increases when the escape path via the bearing clearance is reduced by eccentricity of the shaft, the relationship between the supporting force $F_r$ and the said clearance escape path $h$, being shown by the curve of Fig. 5, from which it will be seen that the force $F_r$ becomes negative when the clearance exceeds a certain size. This is a well-known effect.

Figure 6:
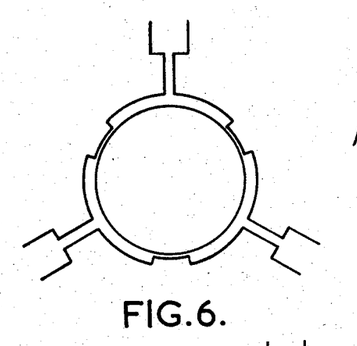
Fig. 6 is a diagrammatic representation of another known type of gas-lubricated bearing.
Figure 7:
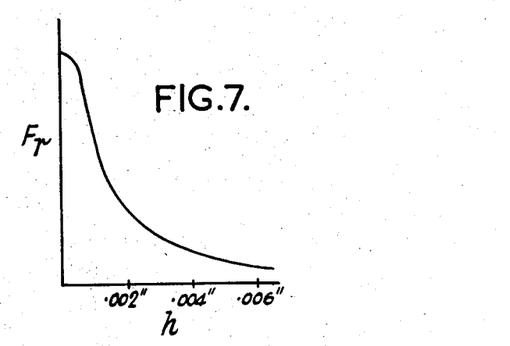
Fig. 7 is a graph relating to the operation of the bearing shown in Fig. 6.

An alternative type of known bearing is shown in Fig. 6. The outer sleeve is provided with a number of shallow radial depressions, each of which is supplied with compressed air through a small orifice or resistance. In this case $F_r$ varies with $h$ approximately as shown in Fig. 7.

If the shaft carries no load it will float centrally in the sleeve, any radial displacement of the shaft from its central position being resisted by the action of the air jets, the restoring force $F_r$ being proportional to the displacement of the shaft from its central position within the bearing sleeve.

A bearing of this type will operate satisfactorily so long as the restoring force $F_r$ is greater than the centrifugal force due to whirl. For a high speed rotor such as that of a turbine, however, the critical restoring force for an eccentricity of half the radial clearance may be as large as one thousand times the weight of the shaft and air bearings of the type shown in Figs. 4 and 6 are inadequate to deal with such forces with any economically feasible air supply pressure and quantity. For reasons not fully understood a turbine shaft will sometimes whirl in its bearing even when it is prevented from rotating about its own axis whilst a force tending to rotate it is being applied.

The present invention provides a force which resists the rotation or whirl of the centre of the shaft about the centre of the sleeve.

Air is supplied under pressure from an external source, and oscillation of the shaft modulates the air stream which flows through the clearance between the shaft and the bearing wall so as to provide an alternating component of current in the air stream, a pneumatic network being provided which, either alone or in conjunction with a pneumatic amplifier generates a component of pressure whose phase is shifted with respect to that of the current. This pressure component is applied to an area of the shaft so that it generates an alternating radial force of a phase such that it resists oscillation of the shaft. For the purpose of analysing and defining the phase relationships of the various air streams and oscillations, a whirling shaft may be regarded as oscillating back and forth along a diameter of the bearing sleeve.

In the simplest form of the invention oscillation of the shaft modulates an air stream supplied through holes in the bearing wall so as to provide an alternating component of current in the supplied air. When the shaft modulates the air supply in this manner the modulated pressure peaks coincide in time with the instants of maximum radial displacement of the shaft from its central position in the bearing sleeve. At these instants the oscillation velocity of the shaft is at a minimum since velocity and displacement are in quadrature with one another. For the maximum resistance to whirl the pressure peaks should coincide with instants of maximum oscillation velocity of the shaft, and it is therefore necessary for the alternating pressure components produced by modulation of the air supply by radial oscillations of the shaft, to be shifted in phase, ideally through 90°, irrespective of oscillation frequency. This ideal phase shift angle may not be achieved, at all frequencies, in practical arrangements according to the invention but an approximation to the ideal phase shift gives a marked superiority over previously known air lubricated bearings.

A number of embodiments of the invention will now be described in relation to Figs. 8 to 26 of the accompanying drawings.

Figures 8, 9:
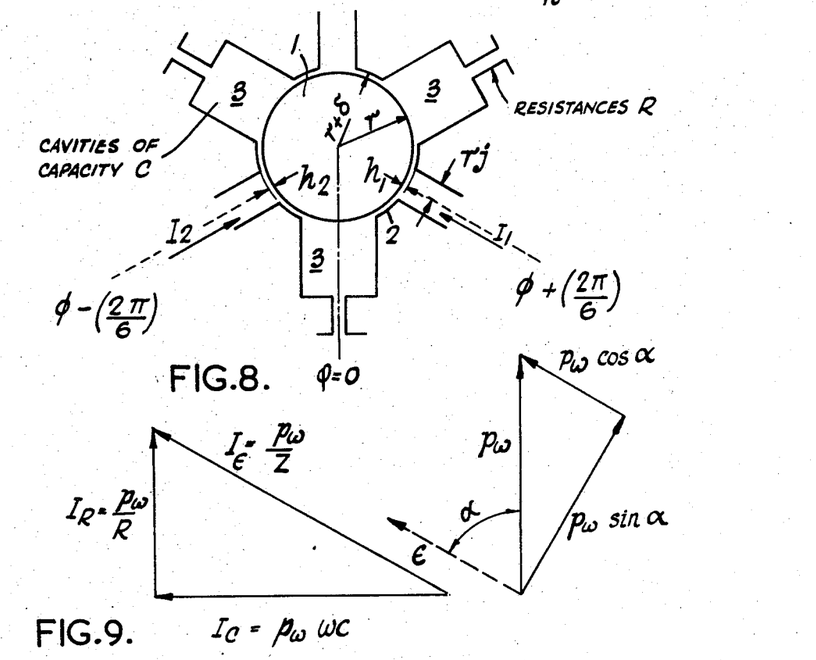
Fig. 8 is a diagrammatic representation of a bearing according to the invention.
Fig. 9 is a vector diagram relating to the operation of the bearing shown in Fig. 8.

In the embodiment shown in Fig. 8, a shaft 1 of radius $r$ is surrounded by a sleeve 2 of internal radius $r+d$ and air from three jets each of radius $rj$, equally displaced around the circumference of the sleeve, flows into three cavities 3 of capacity $C$ and from each of these most of it escapes through an orifice of resistance $R$. The remainder escapes through the clearance between the shaft and the sleeve. Assuming for simplicity of analysis that this portion is negligibly small (although in practice it may be appreciable) the surface of the shaft forms a part of the walls of each cavity, so that the air pressure in the cavity exerts a force on the shaft equal to the product of that pressure and the projected area of the shaft which forms part of the cavity wall.

The current of air entering each cavity 3 of Fig. 8 will consist of a steady component and an A.C. component whose R.M.S. value is proportional to the eccentricity or radial displacement of the shaft from its central position in the bearing sleeve. The capacity $C$ and the resistance $R$, which are effectively in parallel, present an impedance $Z$ to the A.C. component $I$ of the current, and thus the A.C. pressure $p_\omega$ in the cavity is given by $p_\omega = IZ$ where $$Z = \sqrt{\frac{1}{\frac{1}{R^2} + (2\pi f C)^2}}$$

$f$ being the frequency of radial oscillation of the shaft.

The air entering each cavity 3 is contributed in part by each of the jets on either side of it. In the case of the lower cavity in Fig. 8 the air stream from the jet on the right is modulated with a phase $$\phi + \left(\frac{2\pi}{6}\right)$$

and the air stream from the jet on the left is modulated with the phase $$\phi - \left(\frac{2\pi}{6}\right)$$

where $\phi$ represents the phase of oscillation of the whirling shaft referred to a diameter of the bearing sleeve passing through the centre of the cavity, due to the jets being displaced around the bearing in relation to the cavity. The term $$\frac{2\pi}{6}$$

cancels out when the air streams from the two jets combine, so that the air stream entering the cavity is modulated in phase with oscillations of the whirling shaft referred to the said diameter.

Each of the air entry jets contributes to the air stream entering the two cavities, on either side of it. The pressure $p_\omega$ lags behind the current $I$, the phase angle being given by $$\sin \alpha = Z(2\pi FC)$$

where $\alpha$ is the angle of lag. This is represented vectorially in Fig. 9 the left hand portion of which shows the phases of the air currents. The vertical vector $I_R$ represents the current flowing in the resistance $R$, the horizontal vector $I_0$ represents the current flowing in the cavity 3 and the slanting vector $I_\epsilon$ represents the resultant of the other two currents and is in phase with the oscillatory displacement $\epsilon$ of the shaft in the sleeve. The right hand portion of Fig. 9 shows the corresponding pressure phase relationship to the dotted vector $\epsilon$ representing the oscillatory displacement of the shaft in the sleeve. Vector $p_\omega$ is in phase with $I_R$ and represents the A.C. pressure in cavity 3 and it is shown resolved into a component $p_\omega \cos \alpha$ in phase with the current and a component $$p \cos \left(\alpha - \frac{\pi}{2}\right) = p_\omega \sin \alpha$$

lagging 90° behind the current. This lagging pressure component acting on an area of the shaft opposite the cavity resists motion due to oscillations of the shaft.

By making the areas and the cross sectional areas of the air jet orifices sufficiently large the radial oscillation or whirl frequency of the shaft may be reduced to a value such that the centrifugal force due to the whirling of the shaft is less than the restoring force due to the action of the air pressure in the cavities 3, upon the areas of the shaft opposite to those cavities.

Figures 10, 11:
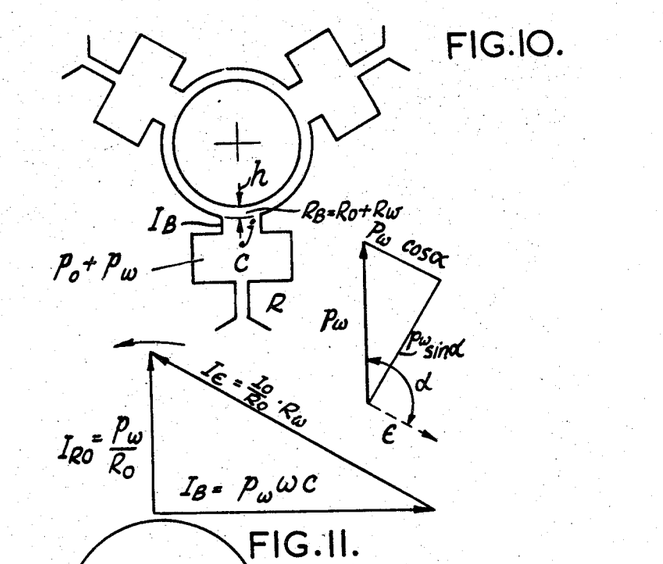
Fig. 10 is a diagrammatic representation of another bearing according to the invention.
Fig. 11 is a vector diagram relating to the operation of the bearing shown in Fig. 10.

In a second embodiment of the invention, shown in Fig. 10, the radial clearance between the shaft and the sleeve is enlarged which has the effect that the shaft is attracted towards each of the jets.

This is a well known effect and it is illustrated in Fig. 5 where, as the distance $h$ between the shaft and the sleeve increases beyond a certain point (.002), the force $F_r$ becomes negative. The attractive force may be assumed to be proportional to the pressure.

The air is supplied to each of three jets communicating with the bearing clearance space, via a resistance R and a cavity of capacity C. The various phase relationships are illustrated vectorially in Figure 11. If the centre of the shaft rotates with an angular velocity $\omega$ and an eccentricity $\epsilon = 00'$ the pressure in the cavity will have an A.C. component $p_\omega$. If the flow of air entering the cavity through R is constant and supposing that the pressure ratio across R is greater than 2, the A.C. component of current $I_B$ in the jet is given by $I_B = p_\omega \omega C$ and is lagging 90° behind the pressure $p_\omega$. The effective size of the jet varies inversely with the clearance $h$, and it has a resistance $R_0$ (its resistance with the shaft stationary and central in the sleeve) and, when the shaft is oscillating, a varying component of resistance $R_\omega$ is added. The left hand diagram shows a current vector $$I_{R_0} = \frac{p_\omega}{R_0}$$

leading the current $I_B$ by 90° and the resultant of these two currents ($I_B$ and $I_{R_0}$) is $I_\epsilon$ and is in anti-phase with the eccentricity displacement vector $\epsilon$, shown dotted on the right hand diagram of the figure. The A.C. component of pressure $p_\omega$, is in phase with $I_{R_0}$ and it can be resolved into a component $p_\omega \cos \alpha$ in phase with the eccentricity vector and a component $p_\omega \sin \alpha$ 90° ahead of the eccentricity vector $\epsilon$ so that when $h$ is increasing $p_\omega$ is large thus resisting the increase of $h$.

Figure 12:
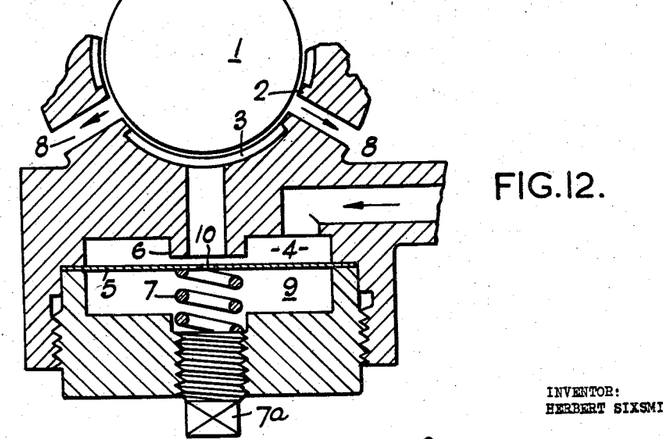
Fig. 12 is a cross section of part of a third bearing according to the invention.

A third embodiment of the invention is shown in Fig. 12. The shaft 1 spins in a sleeve 2 in which three shallow depressions or cavities 3 are formed. The air supply to each of the cavities 3 is controlled by a pneumatic amplifier which responds to pressure variations in cavity 3 with a lagging phase shift. The response is such that an increase of pressure in cavity 3 results in a decrease of current.

Air enters a cavity 4 from which a passage leads to cavity 3. A diaphragm 5, which forms one wall of cavity 4, cooperates with a raised seat 6 formed at the end of the said passage remote from cavity 3, to control the flow of air into cavity 3. Diaphragm 5 is urged towards seating 6 by a spring 7. The other side of diaphragm 5 forms a wall of a closed cavity 9, the only access to which is through a hole 10 in diaphragm 5. The spring 7 is adjustable by means of a screwed plug 7a.

Its action is as follows. Air at constant pressure is supplied to the cavity 4 and lifts the diaphragm 5 off the valve seating 6 against the force of the spring 7, thus admitting air to the cavity 3. The air entering cavity 3 escapes at the ends of the sleeve, but additional escape channels 8 may be provided. Air from cavity 3 leaks into cavity 9 through a resistance constituted by the hole 10 in the diaphragm 5, though an alternative passage could be provided. The pressure in cavity 9 builds up with a time constant $t = R_{10} C_9$ where $R_{10}$ is the resistance of the hole and $C_9$ is the capacity of the cavity 9. Equilibrium is reached when the pressure in cavity 9 becomes equal to the pressure in cavity 3. The volume of cavity 3 is made as small as possible.

In the steady state let $p_0$ be the pressure in cavity 3, and let $R_0$ be the resistance of the leak past the edges of cavity 3. If the shaft rotates or whirls with an angular velocity $\omega$ the pressure in cavity 3 becomes $p_0 + p_\omega$ and the resistance of the leak becomes $R_0 + R_\omega$. The current leaking past the edges of the cavity is given by $$\frac{p_0 + p_\omega}{R_0 + R_\omega}$$

For small amplitudes this may be expanded to $$\frac{p_0}{R_0} + \frac{p_\omega}{R_0} - \frac{p_0 R_\omega}{R_0^2} - \frac{p_\omega R_\omega}{R_0^2}$$

The last term is small and may be neglected. The first term represents the D.C. component of flow through the cavity 3.

In cavity 9 the phase of the pressure lags behind the phase of the pressure in cavity 3. The A.C. component $I_3$ of the current entering cavity 3 is in antiphase with this pressure.

Figure 13:
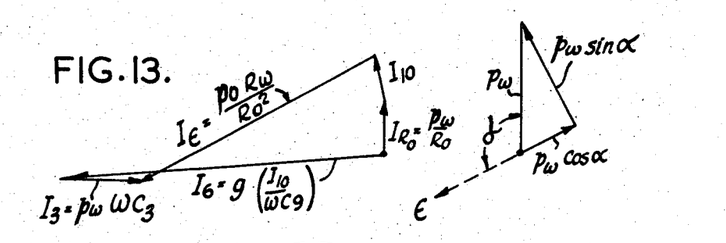
Fig. 13 is a vector diagram relating to the operation of the bearing shown in Fig. 12.

Vector diagrams for the pressures and currents are shown in Fig. 13.

The second term of the above expanded expression for the current may be called $I_{R0}$ and is represented by the vertical vector. Joined to the top of this is the vector $I_{10}$ representing the current through the hole 10. Joined to the bottom end of the $I_{R0}$ vector is the vector $I_6$ representing the current passed through the varying space between the diaphragm 5 and the seating 6.

$$I_6 = g\left(\frac{I_{10}}{\omega C_9}\right)$$

and the term in brackets represents the movement of the diaphragm whilst the symbol $g$ represents the amplification factor of the pneumatic amplifier constituted by the valving action of diaphragm 5 in cooperation with seating 6. Joined to the left hand end of vector $I_6$ is the vector $I_3$ which is equal to $p_\omega \omega C_3$ and represents the current flowing in the cavity 3. Joining the ends of vectors $I_3$ and $I_{10}$ is the vector $I_\epsilon$ which represents the third term of the above expanded expression for current $$\frac{p_0 R_\omega}{R_0^2}$$

and is in phase with the oscillatory displacement of the shaft referred to a diameter of the sleeve passing through the centre of cavity 3.

The right hand side of Fig. 13 shows the pressure vectors. A vertical vector $p_\omega$ is parallel to the $I_{R0}$ current vector and the shaft displacement vector $\epsilon$ is shown by a dotted line. It is parallel to the $I_\epsilon$ vector on the left. The pressure $p_\omega$ has a component $p_\omega \sin \alpha$ which lags 90° behind the eccentricity $\epsilon$. This pressure component acting on the surface of the shaft resists the angular rotation or whirl, and by a suitable choice of values stability may be ensured.

The shaft 1, in the absence of any oscillatory tendency will take up a position in the sleeve which depends principally on the amount of air entering the respective cavities 3, and this may be regulated by adjustment of the springs 7 by means of the plugs 7a so that the shaft runs central in the sleeve under non-oscillatory conditions.

Figure 14:
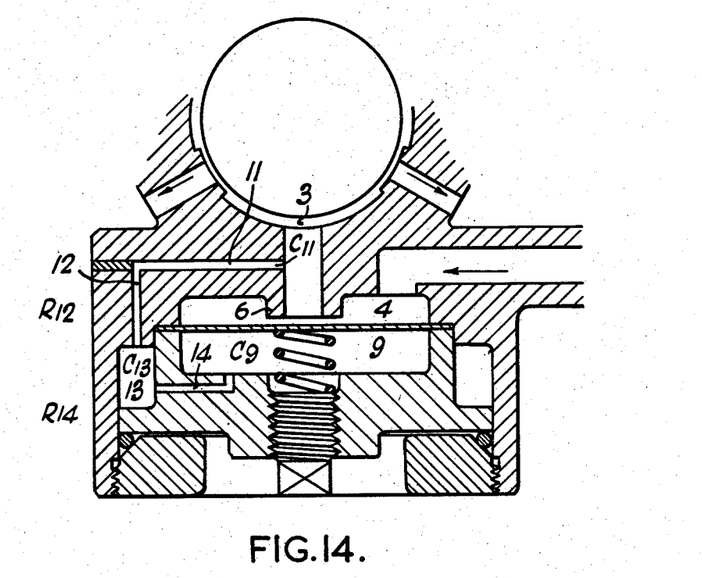
Fig. 14 is a cross section of a part of a fourth bearing according to the invention.
Figure 15:
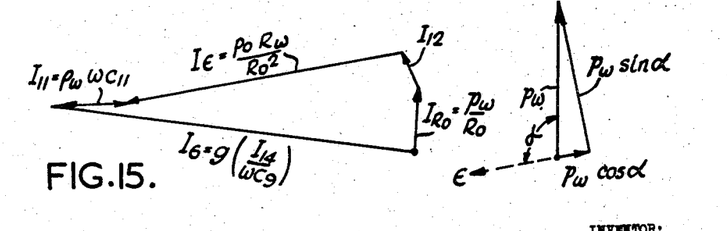
Fig. 15 is a vector diagram relating to the operation of the bearing shown in Fig. 14.

A fourth embodiment of the invention shown in Fig. 14 has an additional resistance and cavity network which increases the phase lag thus increasing the damping. The hole 10 of Fig. 12 is omitted and the space 3, which is made as small as possible, communicates via a restricted passage 12 of resistance $R_{12}$ with a chamber 13 of capacity $C_{13}$ which in turn communicates via a restricted passage 14 of resistance $R_{14}$ with the space 9 below diaphragm 5, of capacity $C_9$. The network $R_{12}$, $C_{13}$ and $R_{14}$ thus takes the place of hole 10 of Fig. 12. The vector diagrams for this arrangement are shown in Fig. 15 which sufficiently resembles Fig. 13 to render detailed explanation unnecessary.

Figure 16:
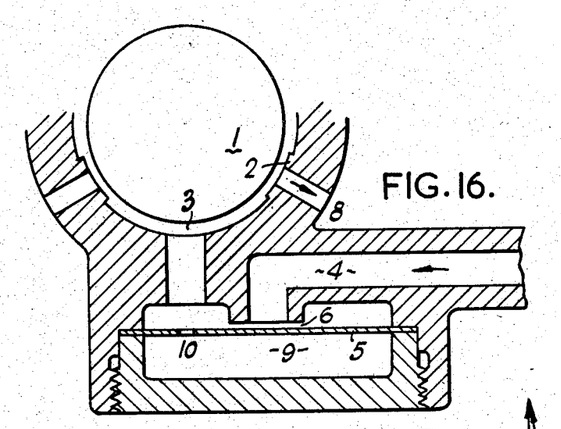
Fig. 16 is a cross section of a fifth bearing according to the invention.

A fifth embodiment of the invention is shown in Fig. 16. The shaft 1 spins in a sleeve 2 in which three shallow depressions or cavities 3 are formed. The air supply to each of these cavities is controlled by a pneumatic amplifier which responds to pressure variations in cavity 3 with a leading phase shift. The response is such that an increasing pressure in cavity 3 results in an increase of current, and vice versa. The action is as follows. Air at constant pressure is supplied via tube 4 to the valve 6 controlled by diaphragm 5. The valve is normally slightly open so that air flows past it into cavity 3. The pressure in cavity 3 builds up until the rate of leakage is equal to the rate of admission. Cavity 3 is connected to cavity 9 through a resistance which may conveniently be a hole or orifice 10 in the diaphragm. The volume of cavity 3 should be as small as possible.

Figure 17:
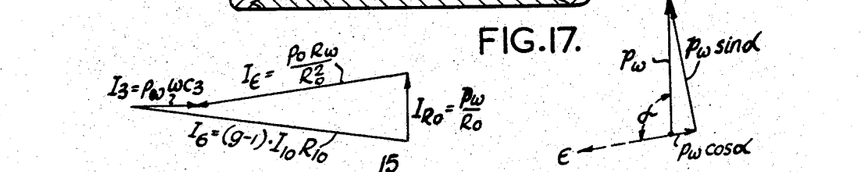
Fig. 17 is a vector diagram relating to the operation of the bearing shown in Fig. 16.

If the centre of the shaft rotates or whirls with an angular velocity $\omega$ and an eccentricity $\epsilon = OO'$ the pressure in cavity 3 will have D.C. and A.C. components $p_0$ and $p_\omega$ and the resistance of the leaks at the edge of cavity 3 will have components $R_0$ and $R_\omega$. Cavity 9 and resistance 10 form a differentiating circuit and hence the current through valve 6 has a component proportional to the rate of change of pressure in cavity 3. Vector diagrams for the pressures and currents are shown in Fig. 17, which is closely analogous to Fig. 13 so as to render a detailed description unnecessary.

The A.C. pressure $p_\omega$ has a component $p_\omega \sin \alpha$ which lags 90° behind the eccentricity $\epsilon$. This pressure component acting on the surface of the shaft resists the angular rotation or whirl, and if the $p_\omega$ is large enough, stability may be ensured.

Figure 18:
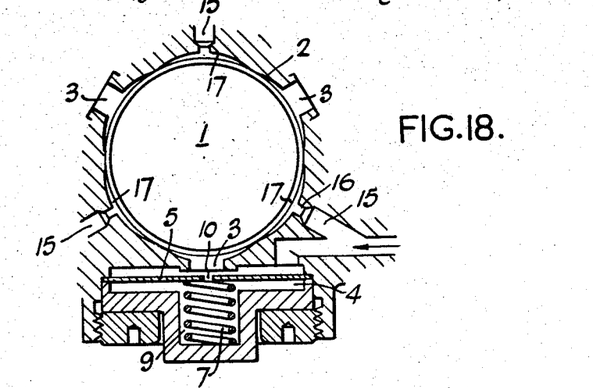
Fig. 18 is a cross section of a sixth bearing according to the invention.

A sixth embodiment of the invention is shown in Fig. 18.

In this embodiment the function of supplying a stream of air into the clearance space to support the shaft centrally has been divorced from the function of damping out oscillation or whirling of the shaft, the first function being carried out by an arrangement similar to the known arrangement illustrated in Fig. 6 and the second being carried out by an arrangement similar to that used in the embodiment shown in Fig. 12. This overcomes a difficulty which may be encountered in adjusting the embodiment of Fig. 12 by means of plugs 7a. If these plugs are adjusted to set the gaps between diaphragms 5 and seatings 6 so as to equalise the steady currents through the cavities 3 so that the shaft is supported centrally in the sleeve under non-oscillatory conditions, the performance of the pneumatic amplifier systems are adjusted at the same time which may throw the latter out of balance. This may make these adjustments inconveniently critical unless fine limits are observed in the manufacture of the bearing to minimise the amount of adjustment required.

The arrangement of Fig. 18 closely resembles Fig. 12 but differs therefrom in that each air entry duct is branched short of the connection to cavity 4, one branch going to cavity 4 and the other via a duct 15 to a calibrated orifice 16, through which air is admitted to a recess 17 in the wall of the sleeve.

The recesses 17 are equivalent to the similar recesses shown in Fig. 6 and behave in the same way.

The pneumatic amplifier and phase shift arrangement 4, 5, 6, 7, 9 and 10 is basically the same as in Fig. 12 and behaves in a similar way though a somewhat different construction has been shown, for instance cavity 9 has been formed in an enlarged housing provided for spring 7, and the cavities 3, and also the cavities 17 are shown with arcuate form which could be achieved by a simple milling operation.

Escape of air from cavities 3 and 17 is via the ends of the sleeve and the outlets 8 shown in Fig. 12 are omitted.

The vector diagram of Fig. 13 applies to the pneumatic phase shift and amplifier system 4, 5, 6, 7, 9 and 10 of Fig. 18 as it does to that of Fig. 12. This vector diagram only relates to the A.C. components of the currents and pressures in the system in any event. It is possible with this arrangement to reduce the steady component of the current passing via cavities 3 to reduce the demands on the air supply source and also the diaphragm 5 may be made more flexible so that it responds more sensitively to oscillations of the shaft.

The necessity for accommodating the cavities 17 as well as the cavities 3, around the inner circumference of the sleeve limits the number of each which can be used as compared with the other embodiments hereinbefore described which permit the number of units to be increased to six or more although only three are shown. In Fig. 18 the maximum number of units is in practice three.

Figure 20:
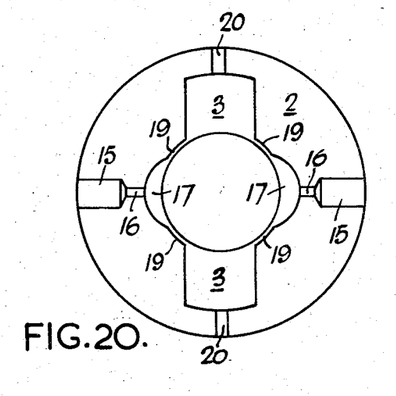
Figs. 20 and 21 are respectively a cross section and an axial section of an eighth bearing according to the invention.
Figure 21:
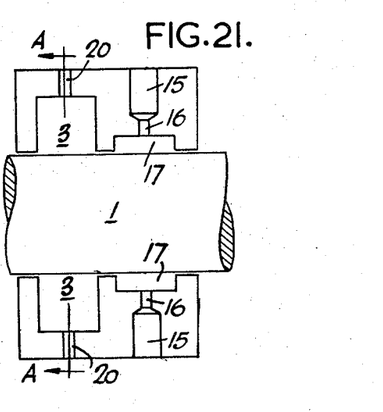

This limitation may be overcome by displacing the cavities 17 axially in relation to the cavities 3, instead of circumferentially and the geometrical layout can be judged from Figs. 20 and 21 which relate to a seventh embodiment of the invention to which the same limitation would otherwise apply.

Figure 19:
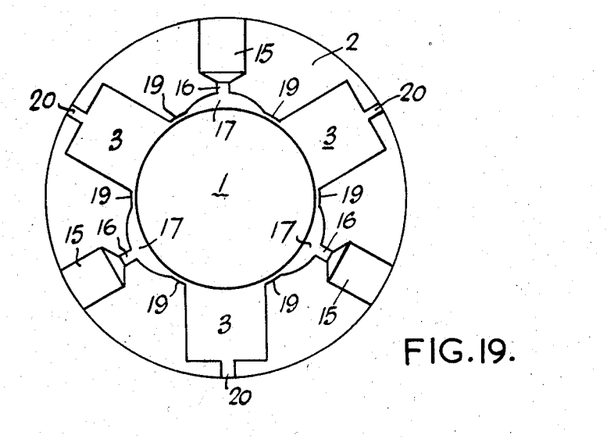
Fig. 19 is a cross section of a seventh bearing according to the invention.

This seventh embodiment is shown in Fig. 19 in a form where all the air supply cavities are disposed around the inner circumference of the sleeve and the arrangement will be described principally in relation to that figure.

The arrangement of Fig. 19 closely resembles that of Fig. 8 but the arrangements of Fig. 6 are combined with it. The main air inlets of Fig. 8 are replaced by metered orifices 16 leading to cavities 17 similar in nature and function to those indicated by the same reference numerals in Fig. 18.

Most of the air entering cavities 17, escapes past the lands 19 into the cavities 3 which correspond to the cavities 3 of Fig. 8, and thence is discharged through the resistive passages 20 of resistance R similar to the corresponding passages shown in Fig. 8.

The performance of the pneumatic phase shift arrangements constituted by the cavities 3 and the resistive passages 20 is the same in principle as that of the corresponding elements in Fig. 8, so that the vector diagrams of Fig. 9 can be applied to Fig. 20. The advantage of this arrangement over that of Fig. 8 is that the radial air input jets can be adjusted by calibration of the orifices 16 so as to centre the shaft in the sleeve under non-oscillatory conditions whereas in Fig. 8, such centreing is at the mercy of the clearances between the shaft and the lands separating the air input jets from the cavities 3 and of the sizes of the resistive passages leading out of the cavities 3.

Figs. 20 and 21 show a similar arrangement to that of Fig. 19 but with two sets of jets 16 and corresponding cavities 3 and resistances 20 disposed around the circumference of the sleeve and another similar arrangement, axially alongside it and turned round through an angle of 90° so that the cavities 3 of the two sets are staggered to give centralising support and oscillation damping at four points equally spaced around the circumference of the bearing.

In the arrangements shown in Figs. 18 to 21 the calibrated orifices 16 should have a high resistance so that the flow of air through them can be regarded as constant as in the case of the resistances R in Fig. 10. It is therefore of no consequence if, in the case of Figs. 20 and 21, some of the air entering a cavity 3 is supplied from an axially adjacent cavity 17 via the clearance between the shaft and the land separating such axially adjacent cavities. Such considerations do not arise in the case of the embodiment shown in Figs. 18 and 19 as cavities 3 and cavities 17 are both independently supplied with air which escapes axially along the bearing clearances.

A possible variant of the arrangements above described is to have the shaft as the stationary element and the sleeve as the revolving element. In this case the jets, cavities etc. would be provided in the shaft instead of in the sleeve. This would alter the geometrical layout of these elements somewhat but the same principles of design would apply.

In the description above reference is made to air as the lubricating or shaft supporting medium. It must of course be understood that any other gas may be used subject to adjustment of the dimensions of the various passages, chambers and the like to suit the characteristics of the gas used.

I claim:

1. A gas-lubricated bearing having first and second mutually interfitting members, one being a shaft and the other a bearing sleeve surrounding the shaft forming a clearance space between opposed surfaces of said two members, one of said members being fixed and the other free to rotate, and passages formed in one of said members for the supply of gas under pressure to said clearance space, at least three chambers in said first member, at least three restricted passages in said first member adapted to offer resistance to the flow of gas, each restricted passage communicating with one of said chambers, said chambers communicating individually with said clearance space to form pressure zones, one of said pressure zones associated with each chamber, each pressure zone being bounded in part by a surface of said second member, said pressure zones being circumferentially spaced around said second member, each chamber and its associated passage forming part of a pneumatic phase-adjusting network operative, when the flow of gas through said chamber and said restricted passage in succession is varied periodically as a result of periodic radial oscillations of said second member, to produce corresponding periodic gas pressure fluctuations the phase of which, at the pressure zone associated with said chamber in question, is such that said pressure maxima occur when the second member is in an intermediate position of oscillatory radial displacement relative to said first member and is moving towards said pressure zone.

2. A gas-lubricated bearing according to claim 1 comprising lands in the surface of said first member adjacent to each pressure zone, the space between the surface of said second member and said lands forming channels through which gas may flow between said clearance space and said chamber associated with such pressure zone and the spacing between said lands and said surface of said second member varying on radial oscillation of said second member in relation to said first member whereby a pressure difference built up across each such channel is variable under control of relative radial oscillations of said second member.

3. A gas-lubricated bearing according to claim 2 in which each chamber and its associated restricted passage together form a pneumatic phase-shifting system adapted to shift the phase of pressure variations in the associated pressure zone as compared with the phase of pressure variations developed across the said channels between the said lands adjacent to the pressure zone.

4. A gas-lubricated bearing according to claim 1 in which each chamber has a wall displaceable in response to pressure variations within said chamber such wall cooperating with a seating surrounding a passage communicating with the associated pressure zone to control the flow of gas to and from said pressure zone, the arrangement forming a pneumatic amplifier to increase the amplitude of pressure fluctuations in the associated pressure zone.

5. A gas-lubricated bearing according to claim 4 in which said restricted passage associated with said chamber takes the form of an aperture in the displaceable wall.

6. A gas-lubricated bearing according to claim 1 in which each chamber in series with its associated restricted passage constitutes one of the said passages for the supply of gas under pressure to said clearance space.

7. A gas-lubricated bearing according to claim 1 in which each chamber in series with its associated restricted passage constitutes a path for the escape from said clearance space, of gas under pressure.

8. A gas-lubricated bearing according to claim 1 in which the said passages for the supply of gas under pressure to said clearance space take the form of passages in the first member communicating with said clearance space at locations circumferentially displaced from one another around said clearance space, each such location being displaced axially of said clearance space from at least one of the pressure zones and separated therefrom by at least one land raised from said surface of said first member.

References Cited in the file of this patent

UNITED STATES PATENTS

| | | |
|---|---|---|
| 1,906,715 | Penick | May 2, 1933 |
| 2,692,803 | Gerard | Oct. 26, 1954 |
| 2,731,305 | Wilcock | Jan. 17, 1956 |

FOREIGN PATENTS

| | | |
|---|---|---|
| 694,521 | Great Britain | July 22, 1953 |
| 716,522 | Great Britain | Oct. 6, 1954 |